United States Patent [19]
Lynch et al.

[11] Patent Number: 5,515,373
[45] Date of Patent: May 7, 1996

[54] TELECOMMUNICATIONS INTERFACE FOR UNIFIED HANDLING OF VARIED ANALOG-DERIVED AND DIGITAL DATA STREAMS

[75] Inventors: John Lynch, San Jose; James B. Nichols, San Mateo, both of Calif.

[73] Assignee: Apple Computer, Inc., Cupertino, Calif.

[21] Appl. No.: 180,926

[22] Filed: Jan. 11, 1994

[51] Int. Cl.$^6$ .............................. H04J 3/02; G06F 13/00
[52] U.S. Cl. ..................... 370/79; 370/85.8; 370/94.1; 370/95.2; 395/375; 395/500
[58] Field of Search ................................. 370/58.1, 58.2, 370/58.3, 60, 60.1, 61, 77, 79, 82, 84, 85.1, 85.6, 85.7, 85.8, 85.13, 94.1, 94.2, 95.1, 95.2, 110.1, 112, 118; 340/825.5, 825.51, 825.52, 825.06, 825.08; 395/200, 275, 375, 500

[56] References Cited

U.S. PATENT DOCUMENTS

| | | | |
|---|---|---|---|
| 4,445,213 | 4/1984 | Baugh et al. | 370/79 |
| 4,539,676 | 9/1985 | Lucas | 370/60 |
| 4,574,284 | 3/1986 | Feldman et al. | 370/79 |
| 4,608,685 | 8/1986 | Jain et al. | 370/85.8 |
| 4,750,171 | 6/1988 | Kedar et al. | 370/85.1 |
| 4,789,792 | 12/1988 | Rüedi | 307/141 |
| 4,926,420 | 5/1990 | Shimizu | 370/94.1 |
| 5,179,710 | 1/1993 | Coschieri | 395/750 |
| 5,305,312 | 4/1994 | Fornek et al. | 370/79 |

FOREIGN PATENT DOCUMENTS

| | | |
|---|---|---|
| 0224149 | 11/1986 | European Pat. Off. . |
| 0228794 | 11/1986 | European Pat. Off. . |
| 0545907A2 | 11/1986 | European Pat. Off. . |
| WO93/20647 | 10/1993 | WIPO . |

OTHER PUBLICATIONS

International Search Report, PCT US95/00444, mailed Aug. 3, 1995.
"Multiple Serial Port Input/Output Handler" *IBM Technical Disclosure Bulletin* vol. 33, No. 11 (1991).
Wright, M., "Modem IC fills fax and data roles and records audio using ADPCM compression" *EDN Electrical Design News* vol. 36, No. 22, pp. 98–99 (1991).

*Primary Examiner*—Alpus H. Hsu
*Attorney, Agent, or Firm*—Burns, Doane, Swecker & Mathis

[57] ABSTRACT

A low-cost yet high-performance, moderate bandwidth (up to 2 Mbps) global telecommunications interface to new and existing computers allows high-performance, low-cost telecommunications platforms to support global fax, data, voice, and other data streams in an intuitive way. The telecommunications interface provides a very low-cost solution to international connectivity for a broad class of existing computers while providing high-performance wide-area data transfer. Convenient and reliable global communications over the phone line may thus be achieved. From a rudimentary viewpoint, the telecommunications interface provides for an elegant, economical implementation of a fax/data modem. The telecommunications interface provides both a time-division multiplexed interface mode for constant bit rate communications and a packetized interface mode for variable bit rate communications. Multiple streams of digital and/or analog-derived data may be handled simultaneously. DMA and non-DMA interface mode am provided in order to achieve compatibility with a broad range of existing and new computers.

21 Claims, 7 Drawing Sheets

POLL FRAME FORMAT

POLL FRAME WITH LENGTH FORMAT

NOP FRAME FORMAT

STREAM ZERO POLL FRAME FORMAT

ACK FRAME FORMAT

DATA FRAME FORMAT
(EXCEPT STREAM ID ZERO DOES NOT INCLUDE FLAGS)

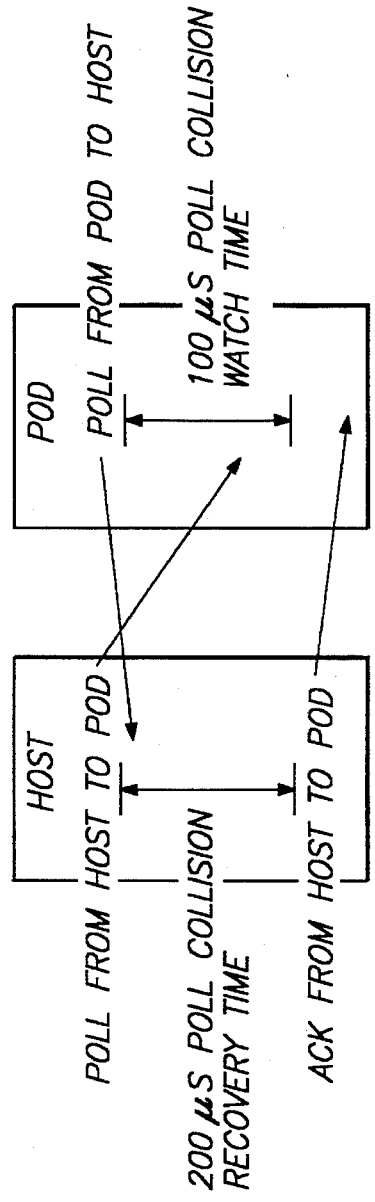
FIG. 16
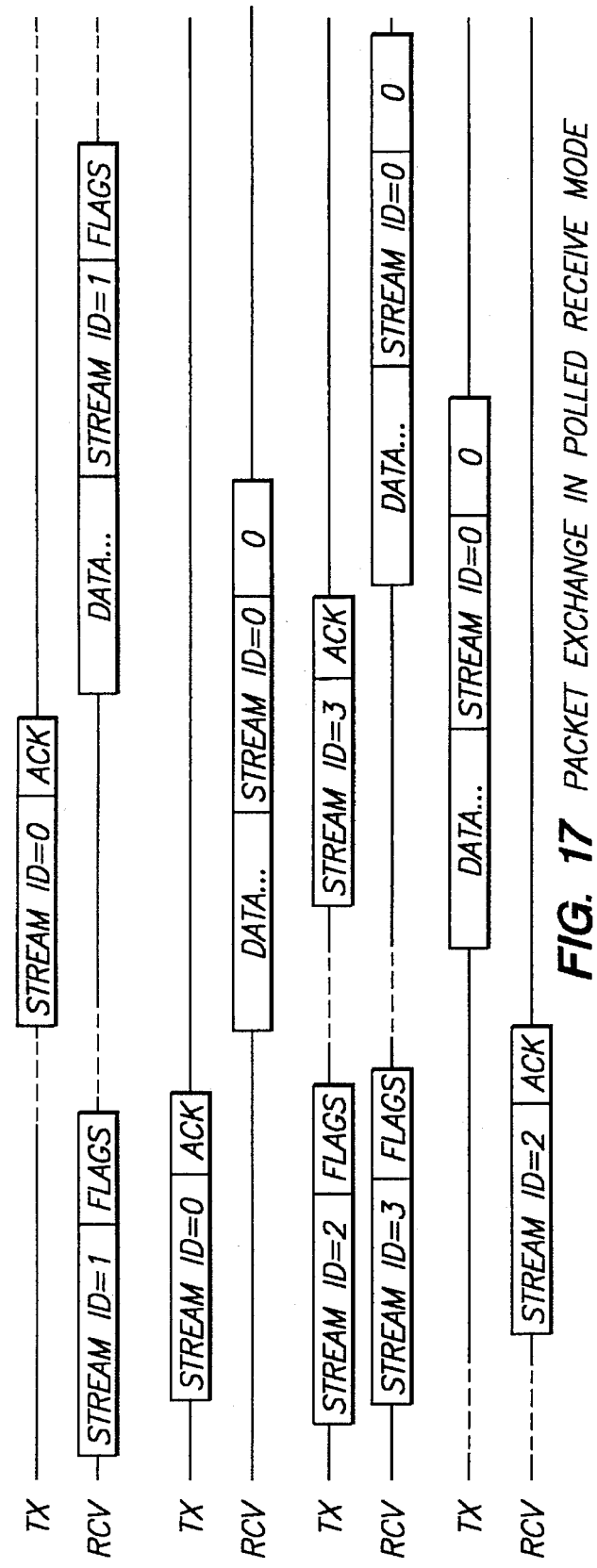
FIG. 17 PACKET EXCHANGE IN POLLED RECEIVE MODE

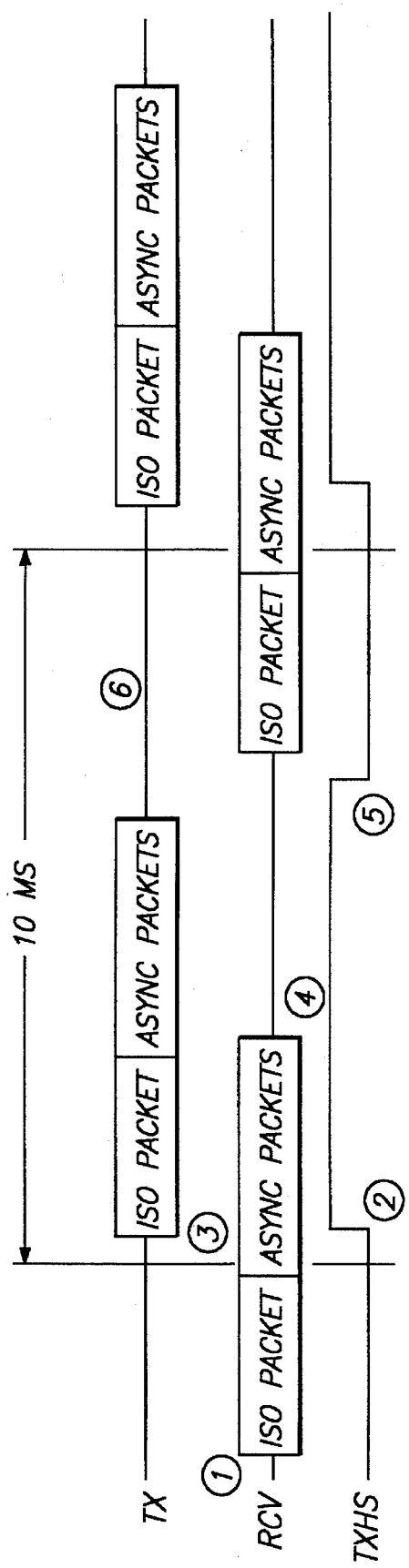

FIG. 18 ISOCHRONOUS TRANSMIT HANDSHAKE MODE

① WHEN THE POD HAS RECEIVED A FULL FRAME OF ISOCHRONOUS DATA IT SENDS A FRAME CONSISTING OF THE ISOCHRONOUS DATA PLUS ANY ASYNCHRONOUS DATA WHICH IS READY.

② AT THE BEGINNING OF THE FRAME PERIOD THE POD ENABLES THE TRANSMIT HANDSHAKE LINE WHICH ENABLES ③ THE TRANSMISSION OF THE NEXT FRAME FROM THE HOST.

④ WHEN THE HOST GETS A RECEIVE INTERRUPT IT PROGRAMS THE DMA TO RECEIVE THE NEXT FRAME FROM THE POD.

⑤ WHEN THE POD GETS A RECEIVE INTERRUPT INDICATING RECEIPT OF THE ISOCHRONOUS FRAME FROM THE HOST IT DISABLES THE TRANSMIT HANDSHAKE LINE IN ORDER TO INDICATE TO THE HOST THAT THE HOST SHOULD REPROGRAM ITS TRANSMIT DMA CHANNEL.

⑥ WHEN THE HOST GETS THE INTERRUPT INDICATING THAT THE TRANSMIT HANDSHAKE LINE HAS BEEN DISABLED IT PROGRAMS THE DMA TO TRANSMIT THE NEXT FRAME TO THE POD.

TELECOMMUNICATIONS INTERFACE FOR UNIFIED HANDLING OF VARIED ANALOG-DERIVED AND DIGITAL DATA STREAMS

BACKGROUND OF THE INVENTION

1. Field of the Invention

The present invention relates to telecommunications protocols and more particularly to telecommunications protocols for use with personal computers and computer workstations.

2. State of the Art

Personal computers and computer workstations with modems now access a wide variety of networks. Although modem communications is generally adequate for exchanging text files, the transmission of voice, fax and video data, especially simultaneous, requires a data rate that exceeds the capabilities of most modems. The Integrated Services Digital Network (ISDN) is designed to provide what appears to the user to be one unified network satisfying all user needs. ISDN has begun to achieve significant penetration in Europe and, somewhat more slowly, in the U.S. In ISDN networks, a digital adapter serves as the communications equipment. Since the data is digital throughout the network, the function of a modem becomes unnecessary.

Early adoption of ISDN has been hampered by what may be referred to as the "chicken-egg" ISDN dilemma. The cost of ISDN technology also remains prohibitive for a broad class of users. The existing installed base of personal computers relies primarily on a standardized, low-bandwidth serial interface to achieve interconnection for telecommunications. For example, the serial port of IBM PCs and compatibles is limited to a data rate of 9.6 kbps. For higher data rates of the type required by ISDN, specialized hardware and software is required.

Furthermore, ISDN is limited to digital data. In the long term, this limitation is likely to be of only passing significance. In the short term (the next five to ten year), however, the exclusively digital nature of ISDN poses a distinct problem. The vast majority of fax machines presently in use are designed to communicate over the analog telephone network. An ISDN user, in order to retain use of such a fax machine, must then have two telecommunications lines, an ISDN line and an analog line. Clearly, the integrated nature of telecommunications envisioned in ISDN will take some time to achieve using ISDN only.

As for conventional modems, the numerous specifications required to establish a high-speed connection present an often insuperable challenge. Furthermore, because the telephone networks in the various countries of the world each have their own different standard and regulations, a conventional modem is not equipped for use in different countries. Business travelers, for example, are unable to use a single device for digital communications throughout the world, but instead must use different devices depending upon their particular location at a particular time.

A host of new telecommunications applications are becoming increasingly available. These include speech I/O, multimedia, enterprise communications, remote LAN access, intelligent telephony and video telephony. Telecommunications interconnections for these applications have thus far been developed on an ad hoc basis. In order to fully realize the benefit of these and other emerging communications technologies, a standard, versatile telecommunications interface is required. The present invention addresses the need for a telecommunications interface that allows high-performance, low-cost telecommunications platforms to support global fax, data, voice, and other data streams in an intuitive way.

SUMMARY OF THE INVENTION

The present invention, generally speaking, provides a low-cost yet high-performance, moderate bandwidth (up to 2 Mbps) global telecommunications interface to new and existing computers. The telecommunications interface allows high-performance, low-cost telecommunications platforms to support global fax, data, voice, and other data streams in an intuitive way. The telecommunications interface provides a very low-cost solution to international connectivity for a broad class of existing computers while providing high-performance wide-area data transfer. Convenient and reliable global communications over the phone line may thus be achieved. From a rudimentary viewpoint, the telecommunications interface provides for an elegant, economical implementation of a fax/data modem.

The telecommunications interface supports real-time data streams in an intuitive way, thus extending the functionality of personal computers within the field of communications and multimedia while paving the way to dramatically useful new applications in the coming decade. These new applications will involve emerging technologies such as speech I/O, multimedia, enterprise communications, and remote desktop access. Voice I/O, data communications, fax communications, intelligent telephony, and hands-free operation may be performed independent of the underlying communications channel. In newer computers having a digital signal processor (DSP) providing sophisticated sound facilities, a special DSP sound driver may be used to patch the DSP sound chain so as to pipe standard sound in and out of the telecommunications interface. Thus, the telecommunications interface data stream may be transparently adapted to system software requirements. Voice I/O, sound record/playback, and other system-standard sound functions may therefore be used over the global network. These system-standard sound functions may include telephone tools to accomplish call management functions, DTMF/pulse dialling and DTMF detection, hookswitch control, incoming call notification, and sound system interface for record/playback.

The telecommunications interface is interoperable with ISDN and allows ISDN to be run on a broad class of the existing installed base of personal computers, potentially ending the "chicken-egg" ISDN dilemma. The telecommunications interface thus provides a low-cost, unified digital wide-area serial interconnect. The resulting uniform view of global connectivity-including PBX, ISDN, and analog phone (voice/data/fax)—treats all channels as a digital data stream. Communications services can operate independent of the transport vehicle (transport independence) such that the installed base of fax machines (25 million worldwide) can send an image to a computer without special analog lines. ISDN "islands" are united by interworking with the worldwide analog phone plant; i.e., digital data can be sent over the telecommunications interface, using ISDN, to an analog phone equipped with a modem. All fax/data standards may be supported, resulting in a tightly integrated digital telecommunications link that brings a new dimension of functionality to personal computers through its datastream processing.

The telecommunications interface is both portable and scalable, allowing communications technologies to be used over a wide range of platforms. A hardware-independent datastream processor model is used with a layered protocol to assure hardware independence. A serial Hardware Abstraction Layer (HAL) "hides" the I/O hardware implementation for the upper protocol layers. Thus, if a different serial subsystem is used in a new generation of computers, the only layer that must be changed is the serial HAL. A Serial Driver provides command, background, and real time isochronous streams, supporting voice I/O, videophone, modems, fax, and other real-time data streams. A Pod Handler implements the functionality provided by an attached telecommunications pod. The telecommunications interface therefore provides an extensible wide-area telecommunications "spigot" for personal computers.

At the same time, the telecommunications interface maintains backwards compatibility with a broad class of existing personal computers. This is achieved by using plug-compatible interfaces at the datastream layer.

BRIEF DESCRIPTION OF THE DRAWING

The present invention may be further understood from the following description in conjunction with the appended drawing. In the drawing:

FIG. 16 is a diagram of a Poll Frame Collision Sequence used by the telecommunications interface to recover from a Poll Frame collision;

FIG. 17 is a timing diagram illustrating packet exchange in a Polled Receive Mode of the Packetized Interface Mode; and FIG. 18 is a timing diagram illustrating packet exchange in an Isochronous Handshake Transmit Mode of the Packetized Interface Mode.

DETAILED DESCRIPTION OF THE PREFERRED EMBODIMENTS

Figure 1:
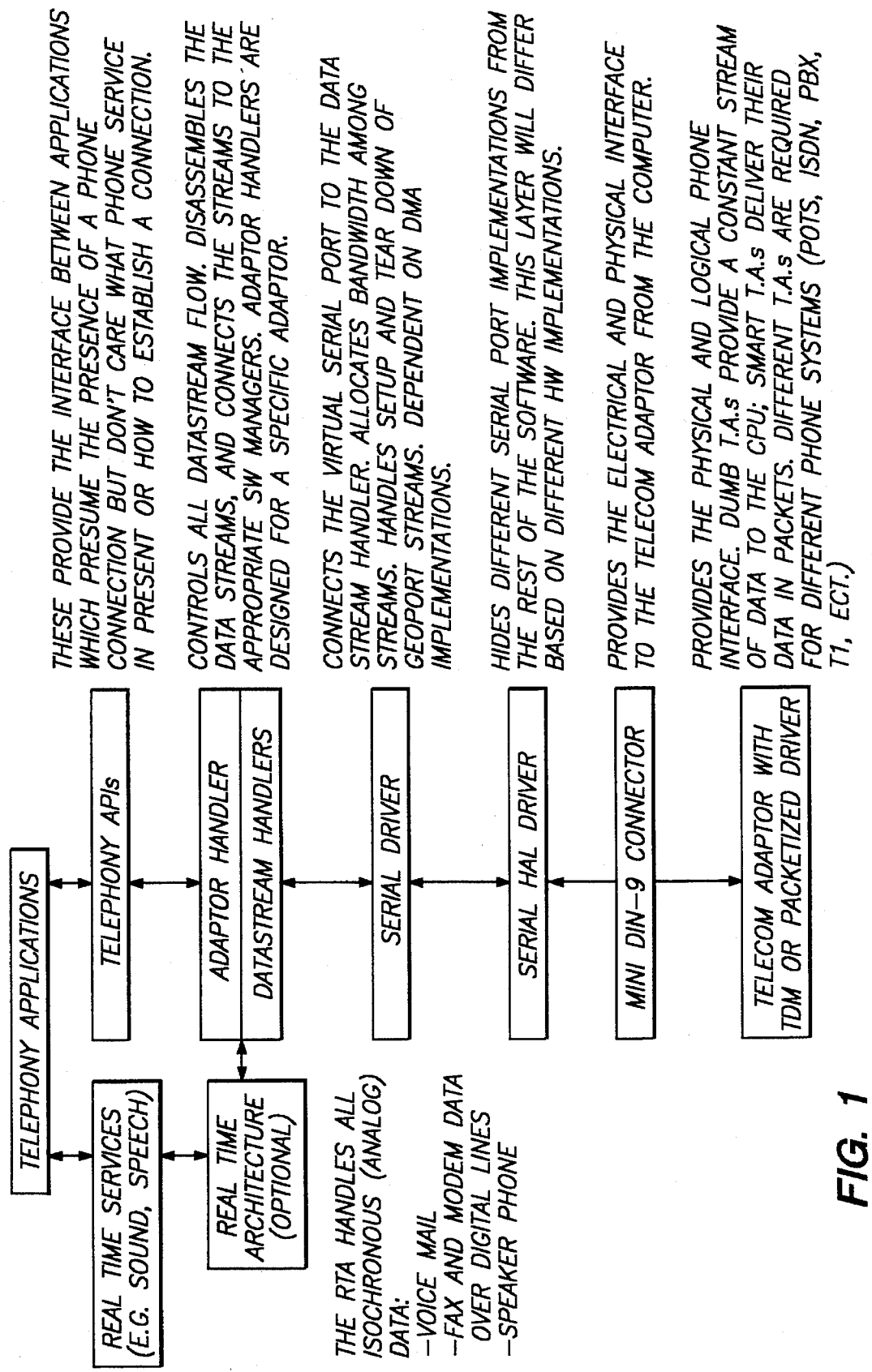
FIG. 1 a simplified block diagram of a telecommunications architecture for intelligent computer telephony in which the present invention may be used.

Described herein is a telecommunications interface that may be used to connect a variety of telecommunications devices, or "pods", to personal computers and computer workstations. The telecommunications interface operates through the serial ports built into virtually all personal computers. This description specifies how data is transferred on the serial line. It does not specify any other parameters of telecommunications pods, such as data formats or command values, since these will be device and implementation dependent.

The telecommunications interface provides support for attaching communication pods through a short cable to a computer's serial port. Thus communications over the telecommunications interface is assumed to be error free. Also, flow control mechanisms are provided to assure that data is not dropped due to lack of buffer space.

The serial telecommunications interface provides support for different modes of communication which are suited to different I/O subsystems currently used by different personal computers. Two types of serial I/O subsystems are widely used on existing computers, while new computers are being designed with quite varied I/O architectures. In one type of serial I/O subsystem, a Serial Communications Controller (SCC) is used that must be serviced totally by the CPU. In another type of serial I/O subsystem, an I/O Processor (consisting, for example, of a 6502 processor and DMA, or direct memory access) is provided which can optionally service the SCC and off-load the CPU. These latter machines can typically also be run in compatibility mode where the SCC is serviced by the CPU. New computers are provided with DMA and channel processors which can off load servicing of the SCC.

Three basic types of pods that may be used with the telecommunications interface are POTS ("Plain-Old-Telephone-Service) pods, ISDN pods and PBX (Private Branch Exchange) pods. POTS pods may be used to provide connections to traditional analog telephone lines. ISDN pods may be used to provide connections to Basic-Rate ISDN lines. Finally, PBX pods may be used to provide connections to proprietary PBX lines. A differentiating characteristic of these three types of pods is that they provide connectivity to one or both of two different types of communication lines, analog and digital. For example, POTS lines are purely analog, ISDN lines are purely digital and PBX lines can be either analog, digital or a hybrid of both. The serial telecommunications interface provides different methods of formatting data across the serial line which are suited to these different types of data.

The telecommunications interface can also be used to support many other types of pods in addition to those just mentioned. For example, it could be used as an interface for a Local Area Network pod. However, the telecommunications interface is limited by the performance of the computer's serial port. On most Macintosh computers, for example, the signaling rate is limited to 918 KBits/Sec (¼ of the SCC's PCLK rate of 3.672 MHz). For limited bursts of data the throughput can approach the actual serial clock rate. However, for extended data transfers, especially those that operate continuously in the background such as for a LAN pod, actual throughput should be limited to avoid non-responsiveness of the computer. This is due to the fact that many computers are 100% dedicated to serial communications when they are receiving or transmitting on the line. On newer computers with DMA, the data rate may be higher. On newer Macintosh computers with DMA, for example, the data rate is limited to 4 Mbits/Sec by the SCC's clock rate and the limits of the RS-422 drivers. Thus on these machines the telecommunications interface is able to support T1 data rates, i.e. 1.544 Mbits/Sec in the U.S. and 2.048 Mbits/Sec in Europe.

Pods connected to the telecommunications interface may have more than one data stream, such as ISDN which has two 64 KBits/Sec 'B' channels and one 16 KBits/Sec 'D' channel. The serial telecommunications interface specifies two types of interfaces, i.e. TDM and packetized, for multiplexing these multiple streams.

Physical and Electrical Interface

Two physical and electrical interfaces are supported by the telecommunications interface. First, both the classic mini-DIN 8 connector and a new mini-DIN 9 connector are supported by the telecommunications interface. Secondly, both a non-DMA electrical interface and a DMA electrical interface are defined.

Both TDM (Time Division Multiplex) and Packetized modes of data transfer are provided as discussed below. Pods which support the TDM interface require a computer which supports the defined DMA interface. Two types of receive modes are described for the packetized interface, DMA and polled. The DMA receive mode requires, as the name implies, the defined DMA interface. The polled receive mode does not require a DMA interface.

By providing two physical and electrical interfaces and both TDM and Packetized modes of data transfer, the telecommunications interface achieves compatibility with a broad range of existing computers and likewise assures compatibility with a broad range of new computers.

Figure 2:
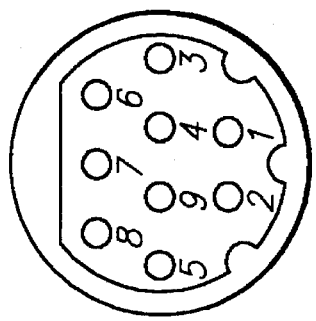
FIG. 2 is a partly schematic view of a Mini-DIN 9 connector that may be used in conjunction with the present invention.

Referring to FIG. 2, a new mini-DIN 9 connector supported by the telecommunications interface is the same as the mini-DIN 8 that is used in may current computers with two slight differences: the addition of a ninth power pin, and a keying indentation. Older-style mini-DIN 8 plugs are able to plug into the new connector socket since the pin alignment on the first 8 pins is identical. The keying indentation helps to prevent the user from attempting to plug a mini-DIN 9 cable into a mini-DIN 8 connector which could damage the ninth pin on the cable.

In order to adapt a machine with an eight pin connector instead of the nine pin connector to a pod which requires the ninth pin, an adapter must be provided. One possible adapter might have three connections, an 8 pin cable running to the classic 8 pin mini DIN connector on the computer, a nine pin connector for the pod and, in the case of a Macintosh computer, for example, an ADB (Apple Desktop Bus) connector to tap power off of the ADB system. This adapter could optionally turn the machine on, for example when the phone rings, since it is an ADB device.

The electrical definition of the signals which are defined on the telecommunications interface is a superset of the standard serial interface. Two interfaces for the telecommunications interface are defined, one for machines with a DMA interface and the other for machines without DMA. Table 1 shows the pin definitions for the connector of FIG. 2.

TABLE 1

| Pin # | Standard Definition | GeoPort DMA Definition | GeoPort Non-DMA Definition |
|---|---|---|---|
| 1 | $HSK_o$ | Pod Reset/Att | Pod Reset/Att |
| 2 | $HSK_I$ | $SCLK_I$ | $SCLK_I$ |
| 3 | $TxD_{a-}$ | $TxD_{a-}$ | $TxD_{a-}$ |
| 4 | SHIELD_GND | GND_return | GND_return |
| 5 | $RxD_{a-}$ | $RxD_{a-}$ | $RxD_{a-}$ |
| 6 | $TxD_{a+}$ | $TxD_{a+}$ | $TxD_{a+}$ |
| 7 | $GPi_A$ | WAKEUP/TxHS | Unused |
| 8 | $RxD_{a+}$ | $RxD_{a+}$ | $RxD_{a+}$ |
| 9 | +5 VDC | DC Power | DC Power (if available) |

The definitions for the TXD+, TXD−, RXD+ & RXD− pins are identical to those for the standard serial port connector. The other pins have new definitions which are outlined below, although it should be added that the input and output characteristics of these pins have not changed. Thus, all standard serial port input pins are maintained as inputs and all standard serial port outputs are still outputs on the connector of FIG. 2.

There are three control pins on the standard serial port connector: $HSK_0$, HSKi and $GPi_A$.

The $HSK_0$ line can optionally provide a single or dual function at the discretion of the pod developer. In single function mode the $HSK_0$ line acts simply as a reset line such that when $HSK_0$ is driven active (high on cable) for at least 1 μs the pod must reset itself to a known state. At the end of the pulse, termed the reset pulse, the pod must enter a "beacon state", or pod identification and self-configuration state, described in detail below.

In dual function mode the $HSK_0$ line not only supports the reset function but also an attention function. An attention pulse is defined as an active (high) pulse, ranging in duration between 1 and 5 μs. This can be used to interrupt the operation of the pod to perform some critical operation, such as enter a debugger for development purposes. The actual functioning of the attention pulse is pod specific. In the dual function mode the reset pulse is defined to be an active pulse greater than 15 μs in duration.

When the telecommunications interface wants to force a pod into the beacon state it will always hold the reset line active (high) for more than 15 μs to support either type of $HSK_0$ mode. Also, the telecommunications interface will never hold the $HSK_0$ line active for longer than 50 ms. This prevents a non-conforming device from going active for a long period of time. Some serial devices interpret $HSK_0$ as the DTR (Data Terminal Ready) line and may perform automatic operations when it goes active such as dial a phone. Keeping the $HSK_0$ active period to 50 ms is designed to prevent these problems.

The serial clock is provided by the pod on the pin SCLK (pin 2). The clock rate will depend on the capabilities of the particular host machine. For example, the maximum clock rate supported on current Macintosh computers is 918 Kbits/Sec. Some newer Macintosh models support at least 2.048 Mbits/sec. (This rate is mandatory for synchronization with the newer Macintosh's sound/DSP subsystem as described in greater detail in copending U.S. Application Ser. No. 08/058,257 filed May 7, 1993, incorporated herein by reference.) If a developer of a pod wants to support a broad class of machines but only wants to support one clock rate they must provide the pod with a clock rate not greater than that supported by the slowest machine. The developer can also choose to have their pod support both a lower clock rate and a higher clock rate for better performance on new machines. The actual data rate is negotiated during the beacon phase, described below.

The $GPi_A$ input pin serves two functions. First of all it provides a WakeUp signal to the computer. This allows a pod to turn on the computer when there is an incoming call. Secondly, $GPi_A$ serves as the transmit (to pod) DMA handshake line.

The DC power feed provides 5 volts at 300 mA to the pod. This will provide enough power for the vast majority of devices thus eliminating the need for a separate power supply for the device. On machines which do not incorporate a nine pin mini DIN connector a special adapter is required to adapt the pod's 9 pin cable to the 8 pin mini DIN connector and to provide power to the pod through some other means, such as an ADB connection or an external power supply.

On machines which support the "wakeup on incoming call" feature, pin 9 provides trickle power from the host to the pod. For machines which do not support this feature, the pod powers down along with the host.

As described below, there are two types of Data Stream Interfaces, TDM and Packetized, supported by the telecommunications interface. The TDM Interface employs an asynchronous form of communications with 1 start bit, 1 stop bit and no parity. The Packetized Interface employs HDLC framing; i.e., a flag character (0x7E) is sent at the beginning and end of a frame with zero bit stuffing used inside the frame.

Asynchronous framing was chosen for the TDM Interface since data is not transferred in blocks but as individual bytes as they arrive off of the communications line. HDLC framing is only advantageous in cases where data is transferred in large blocks such as is the case for the Packetized Interface.

Asynchronous framing is adequate for TDM interfaces where the aggregate data transfer rate does not approach the clock rate on the interface (2.048 Mbits/Sec in a preferred embodiment). Support of "Monosync" mode may also be desirable for cases where an actual data rate of 2.048 Mbits/Sec is to be supported since there would not be any bandwidth remaining for the Start and Stop bits of asynchronous framing.

In a preferred embodiment, all data is encoded in NRZ format. Data is sent using RS-422 drivers with differential pairs for the transmit and receive data.

Pod Handling

When the pod powers up or receives a reset pulse it will send a beacon signal which is used to identify the type of pod and to synchronize the computer and the pod. This is termed the Beacon Phase of the Interface. The pod's beacon can be used to identify and load the appropriate Pod Handler software module in the computer.

In an exemplary embodiment, the beacon signal consists of the following:

0xA5, 0x5A, Pod Id MSB, Pod Id LSB,

Pod Parameter MSB, Pod Parameter LSB, Checksum where Pod ID is a 16 bit quantity identifying the type of serial device which is attached. The pod ID can be mapped to a specific Pod Handler software module used to handle communications with this type of device. The Pod ID is divided into two fields, a family ID in the high byte and a pod specific ID in the low byte.

Family IDs may include, among others, IDs for telephony, digital imaging devices, and LANs. Telephony pod IDs may include, among others, IDs for POTS, ISDN, and PBXs.

The Pod Parameter bytes are a local matter to the pod and can be used to relay basic information such as the hardware revision of the pod.

In an exemplary embodiment, the Checksum is calculated on all bytes in the beacon (i.e., 0xA5+0x5A+Pod Id Byte 2+. . .+ Pod Parameter Byte 0), and carry is ignored (i.e., the addition is simply done modulo 0x100).

The beacon signal is always sent with asynchronous framing: 1 start bit, 1 stop bit and no parity. It can either be sent at 9600 baud or at the telecommunications interface clock rate. When sending at the telecommunications interface clock rate, Packetized Pods should not send beacon bytes more frequently than 1 byte per millisecond to avoid overrunning the computer's receiver. TDM pods do not have the same requirement since they cannot operate with non-DMA machines. The pod should transmit the defined beacon signal just once. In accordance with a current definition, the pod should complete the beacon signal within 200 ms and transmit the first byte no sooner than 10 ms after the end of the reset pulse, although other definitions are also possible.

A beacon acknowledge sequence is defined on the packetized interface which terminates the beacon sequence in the pod and prepares it to begin receiving packets. The beacon acknowledge sequence consists of thirteen bytes as follows:

0x5A, 0xA5, Interface Type, Communication Flags Byte,

Data Speed Byte 3, Data Speed Byte 2, Data Speed Byte 1, Data Speed

Byte 0, Maximum Host to Pod Frame Size MSB, Maximum Host to Pod

Frame Size LSB, Maximum Pod to Host Frame Size MSB, Maximum Pod to Host Frame Size LSB, Checksum The value of Interface Type on a the present telecommunications interface is always a fixed predetermined value. This allows other interface types to be supported by a single pod. For example, if the pod is to be connected to a Macintosh computer with the present protocol and to a PC with a different protocol, then the Interface Type would take on a different value in these two cases.

The Maximum Data Speed parameter is a 32 bit quantity which indicates the maximum data speed that the computer can support. If the pod can support a data rate less than or equal to this value then it will respond with the actual value in its beacon completion sequence. If the pod only supports clock rates greater than this value it will respond with an error in the result code since the pod is incompatible with the computer.

The maximum frame size parameters indicate the maximum size frames in bytes that the computer can support in each direction. The pod will respond with the same parameters in its beacon completion sequence. If the pod can support this or a larger size frame it will respond with the same value. If the pod can only support a smaller size frame it will respond with the smaller size. This negotiation of frame size at beacon time determines the maximum size that each side can support. The current size can be dynamically adjusted downward from these settings by a Set Frame Size stream zero command, where stream zero is designated as the control stream.

The Checksum is calculated, just as in the case of the beacon sequence, on all bytes in the beacon acknowledge; i.e., 0x5A+0xA5+Interface Type+. . .+ Maximum Pod to Mac Frame Size LSB, and carry is ignored.

Figure 3:
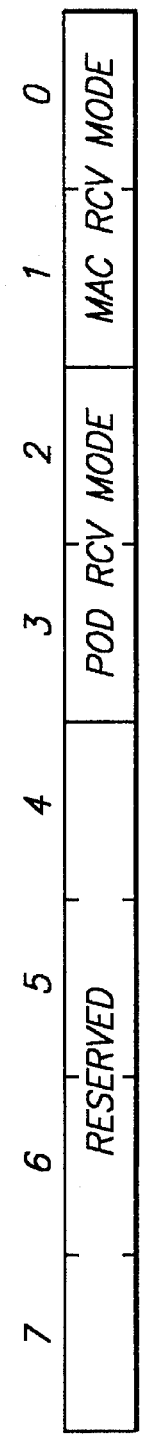
FIG. 3 is a diagram of a Communication Flags Byte transmitted by the telecommunications interface during an initiation sequence.

The format of the Communication Flags Byte is illustrated in FIG. 3. In an exemplary embodiment, the meaning of these bits is as follows:

| | |
|---|---|
| Host Rcv Mode | Indicates the receive mode of the Host |
| 00 | Host will operate in polled receive mode with length field |
| 01 | Host will operate in polled receive mode without length field |
| 10 | Host will operate in DMA receive mode |
| 11 | Host can operate in either polled or DMA receive mode |
| Pod Rcv Mode | Indicates receive mode expected of the pod |
| 00 | Pod is expected to operate in polled receive mode with length field |
| 01 | Pod is expected to operate in polled receive mode without length field |
| 10 | Pod is expected to operate in DMA receive mode |
| 11 | Pod can operate in either polled or DMA receive mode |
| Reserved | Unused and should be ignored by the pod |

In a preferred embodiment, the pod can modify the receive mode in the beacon completion sequence only in certain cases. If either modes is specified as '11' in the beacon acknowledge sequence the pod must respond with one of the non '11' modes in the beacon completion sequence. Pods which can support both polled and DMA receive modes should favor DMA mode. Also, if either mode is specified as '01' it can be downgraded to '00' by the pod in the beacon completion sequence. These receive modes are described in detail in conjunction with the packetized interface below.

The pod responds to the beacon acknowledge sequence with a beacon completion sequence. The beacon completion sequence consists of ten bytes as follows: Result Code, Communication Flags Byte, Data Speed Byte 3, Data Speed Byte 2, Data Speed Byte 1, Data Speed Byte 0, Maximum Host to Pod Frame Size MSB, Maximum Host to Pod Frame Size LSB, Maximum Pod to Host Frame Size MSB, Maximum Pod to Host Frame Size LSB The result code indicates whether the pod is operating correctly at this point and if the parameters indicated in the beacon acknowledge sequence can be supported by the pod. If the result code is negative then an unrecoverable error has occurred. Either a pod self test failed and the pod is inoperable or one of the communication parameters is incompatible with the pod. The following result codes are defined:

| Result Code Symbol | Value | Description |
|---|---|---|
| noErr | 0 | No errors |
| kPrIncompSpeed | −1 | Pod does not support this low of a data rate |
| kPrIncompRcvMode | −2 | Pod does not support the indicated receive modes |

Result codes less than −127 are considered to be pod specific and are simply passed on to the pod handler.

The communication flags byte and pod frame size negotiation is described above.

The Data Speed indicates the actual telecommunications interface clock speed that will be provided by the pod to the host through the telecommunications interface. This allows the host to set timing parameters accordingly.

Data Streams

Multiple streams of data can be supported between a pod and the host through the present telecommunications interface. For example a POTS telephony pod could support two analog channels, one for attachment to the phone company and the other for a handset. Another example is an ISDN pod which can support two 64 KBits/Sec 'B' channels and one 16 KBits/Sec 'D' channel. In addition, other streams can be utilized for special pod control functions, such as debugging of an embedded processor.

Two completely different types of data stream interfaces are supported by the telecommunications interface, namely TDM (Time Division Multiplexed) and Packetized. The TDM Interface is employed by pods which provide Constant Bit Rate (CBR) streams of data to the host. In this case the different streams are sent as interleaved data units which repeat ad infinitum. The TDM Interface is only supported on hosts equipped with DMA and a defined DMA interface.

The Packetized Interface is intended to be supported on all host machines and provides support for both Constant Bit Rate (CBR) and Variable Bit Rate (VBR) streams of dam. Packets are used both for carrying VBR streams associated with the target communication lines and also to exchange control/status information between the host and the pod. If CBR streams are also present they are handled by reserving bandwidth at strict intervals on the interface. The telecommunications interface Serial Driver provides the basic mechanisms for multiplexing these data streams on the Packetized Interface.

Describing in greater detail the TDM Interface, the TDM Interface is supported by specific DMA hardware in the host. First of all, the DMA is required to be full duplex. Secondly, a transmit handshake line is provided on the serial telecommunications interface as described above. When the pod wishes to exchange a set of CBR data with the host it simply transmits any bytes destined for the host and then uses the transmit handshake line to force the host to transmit the appropriate number of bytes to the pod. In this way, the Constant Bit Rate stream can be maintained without any intervention by the host CPU. Also, the pod is better than the host at maintaining the timing of this Constant Bit Rate Stream since the pod is directly servicing the source of the stream, namely the communication line(s).

Figure 4:
FIG. 4 is a diagram of a generalized TDM frame used by the telecommunications interface in a TDM Interface Mode.

The TDM Interface is supported in the host by the Serial HAL in FIG. 1 which provides the DMA primitives for setting up this CBR stream and by the Datastream Handlers (such as sound I/O drivers), also in FIG. 1, which process the CBR data streams. Control of a pod through a TDM Interface is pod dependent and is left completely up to the Pod Handler (Adapter Handler in FIG. 1). Typically, though, TDM data streams are broken up into fixed length frames consisting of a control field and a data field as shown in FIG. 4. The Control Field carries pod dependent information and the Information Field carries the data. These frames are repeated at a fixed period of time, called the frame period. The Control Field is completely masked from the Datastream Handlers by the Pod Handler which sets up the data buffers for these frames. The specifics of the Control Field are therefore specified independently for each TDM type pod.

The Information Field of a TDM Frame consists of an integral number of interleaved sets of data for each stream.

Figure 5:
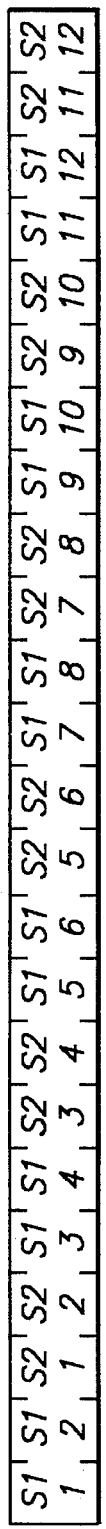
FIG. 5 is a diagram of an example of the TDM Information Field in FIG. 4 with streams having one interleave factor.
Figure 6:
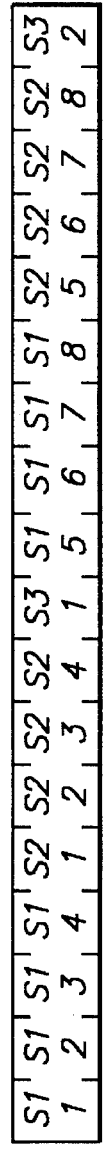
FIG. 6 is a diagram of another example of the TDM Information Field in FIG. 4 with streams having another interleave factor.

The number of bytes in each set for a stream is called the stream's Interleave Factor (IF). FIG. 5 and FIG. 6 give two examples of TDM frames with streams of varying IFs.

Each stream in the Information Field is characterized by three parameters:

1. Interleave Factor: the number of bytes in each occurrence of the stream.
2. Offset: the number of bytes into the information field that the first byte of the stream occurs.
3. Repeat Factor: the offset between the first byte of one occurrence of the stream and the first byte of the next occurrence of the stream, which will be the same for all streams.
4. Total Frame Size: total number of bytes in one frame.
5. Frame Rate: number of frames per second For example, in FIG. 6, Stream 3's interleave factor is 1, it's offset is 8 and its repeat factor is 9. From these parameters the Datastream Handlers are able to extract and insert the data streams they are responsible for handling. In a preferred embodiment, there is no support provided for dynamically sizing the amount of data being sent between the pod and the host. For example, on a T1 interface, which supports 24 voice capable channels of 64 KBits/Sec, dynamic sizing would allow transfer of just those channels which are active. However, this would vastly complicate the handshaking required between the isochronous stream handlers, the pod handler and the pod. Hence, dynamic sizing is not supported.

Figure 7:
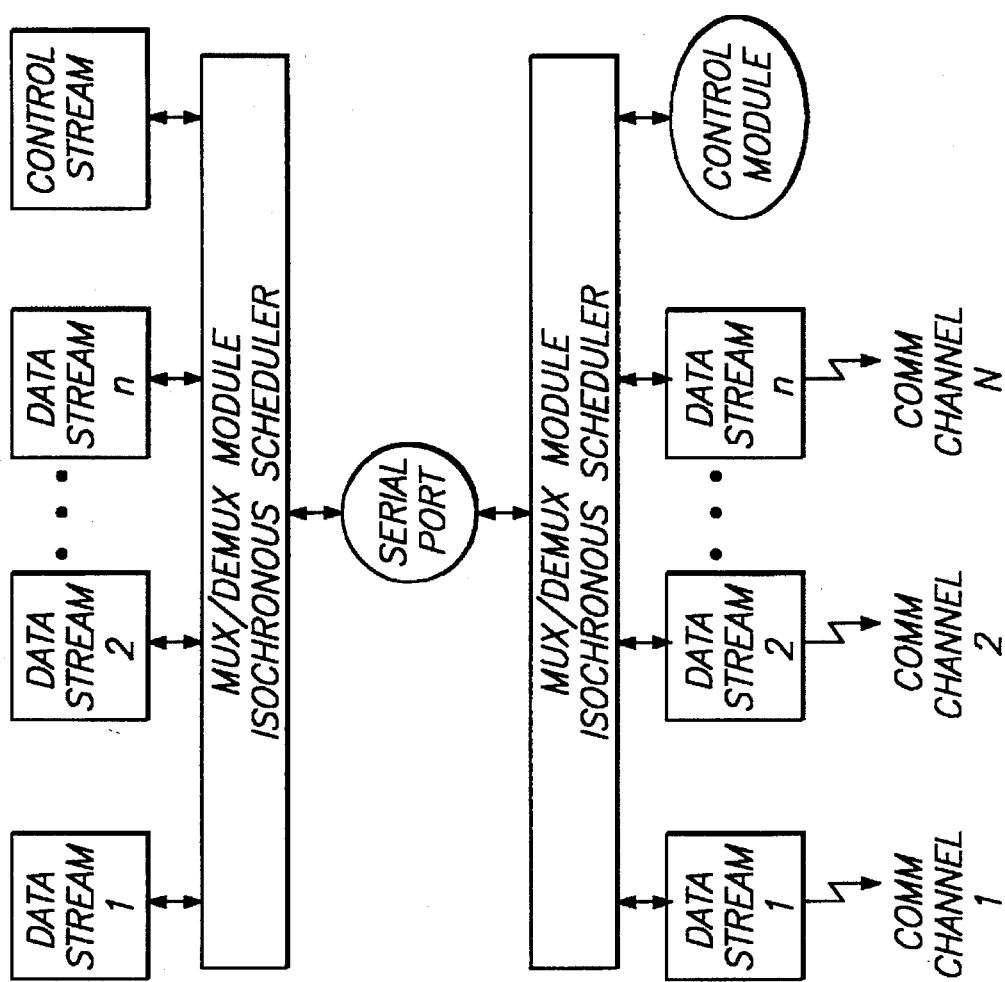
FIG. 7 is a diagram of a stream model used in the telecommunications interface.

On the Packetized Interface data for different streams is not interleaved as in the TDM Interface but is packetized and sent using HDLC framing between the pod and the host. FIG. 7 depicts the multiple streams environment. As shown, multiple data streams are multiplexed across the serial port along with one or more control streams for controlling the pod. The primary control stream will typically originate from the pod handler. The control stream can be used to control connections on the data streams in addition to general pod functions.

Three basic types of streams are defined on the Packetized Interface which provide different types of services for the data being sent on those streams:

1. Isochronous: Isochronous streams carry constant bit rate data such as voice or video. This data is collected in frames of fixed size which repeat at a specific period called the frame period. For example, on ISDN a 64 KBits/Sec 'B' channel carrying voice data would typically repeat with 80 bytes every 10 ms. Isochronous streams do not provide any flow control since by definition data must be consumed at each side within the set frame period.
2. Command: Command streams are used to send commands and responses between the host and the pod. Stop and wait flow control is used on command streams; i.e., once a command is sent another command cannot be sent until a response is received from the other side. The response may include user data which is passed back to the client that issued the command. Command streams are inherently block mode interfaces, i.e. commands and responses are delivered as a whole unit to the other side.
3. Asynchronous: Asynchronous streams are used typically to carry traditional computer data, e.g. AppleTalk or TCP/IP. Asynchronous streams use a sliding window flow control mechanism to assure that the transmitter does not overflow the receiver. Sliding window flow control allows for higher bandwidths than stop and wait flow control. Sliding window flow control processes in traditional protocols such as TCP and ADSP are much more complicated due to the fact that they incorporate error recovery algorithms. Error recovery is not required since the telecommunications interface is assumed to be error free. Asynchronous streams also provide Rate Control from the host to the pod to assure that all streams get reasonable access to the bandwidth of the serial telecommunications interface. Asynchronous streams can be configured to provide either stream or block mode service. Stream mode service simply delivers a stream of bytes from one side to the other without regard to the block of data they were originally sent with. Block mode service always delivers data in the original block provided by the transmitting client.

A priority is also associated with command and asynchronous streams which controls which stream's data gets sent first on the serial interface.

There am two types of packetized receive modes, DMA and Polled. Receivers which support the DMA receive mode can support 256 streams in a preferred embodiment, each of which is identified by an 8 bit ID. Polled mode receivers either support 256 or 8 streams in a preferred embodiment depending on whether they require the length field in the poll frame, as described in greater detail below.

Stream Zero is used to send special protocol control packets and is not available for data transfer. Thus the total number of data streams is 255, in the case of the DMA and the Polled without the length field receive modes, and 7, in the case of the Polled with length field receive mode.

DMA Receive Mode Protocol

Figure 8:
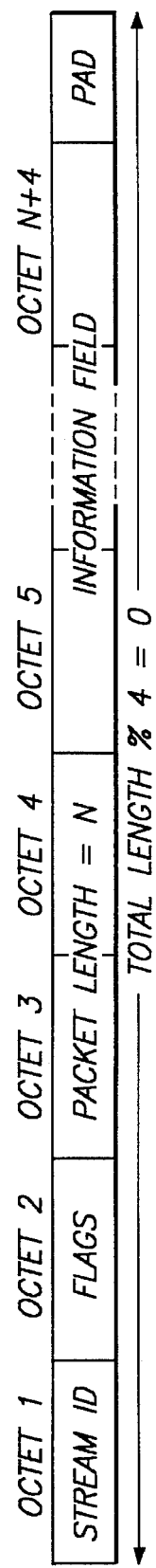
FIG. 8 is a diagram of a basic DMA packet format used by the telecommunications interface in a Packetized Interface Mode.

The basic DMA packet format is as shown in FIG. 8. The first field is the stream ID, the length of which limits the number of streams in the preferred embodiment to 256. Stream Zero is reserved as the control stream for the serial telecommunications interface. Stream Zero commands are described more fully below. The flags field is defined also defined below.

The packet length field indicates the length of the information field. The packet must be padded such that the packet is an integral number of long words including the CRC. For example, if the number of bytes through the end of the Information Field constitutes an integral number of long words, the pad would have to be 2 bytes which, with the CRC, would again constitute an integral number of long words.

Figure 9:
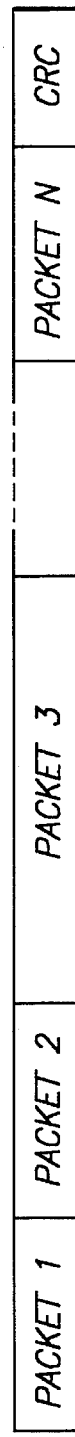
FIG. 9 is a diagram of a multi-packet frame used by the telecommunications interface in a Packetized Interface Mode.

Multiple packets can be sent in one HDLC frame as shown in FIG. 9. Each packet within the MultiPacket Frame must constitute an integral number of long words and the entire frame counting the CRC must constitute an integral number of long words.

Polled Receive Mode Protocol

Figure 10:
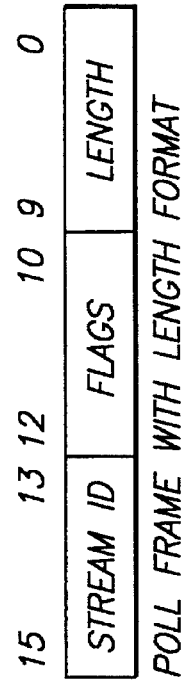
FIG. 10 is a diagram of a Poll Frame fore, at used by the telecommunications interface in a Polled Receive Mode of the Packetized Interface Mode.

The frame formats used in the polled receive mode are shown in FIG. 10. When side 'a' wants to send data to side 'b' it sends a poll frame. When side 'b' has received the poll frame and is ready to receive the data it responds with an ack frame. At this point side 'b' must be prepared to receive the data frame. When side 'a' receives the ack frame it sends the data frame.

The polled packet receive mode assumes that the associated receiver is capable of receiving the two byte poll and ack frames at any time. In the case of a serial interface using an SCC, this is guaranteed by the fact that the SCC has a three byte receive FIFO, so even if some time elapses before the host is able to respond to the receive interrupt the data will still remain in tact in the FIFO.

Maximum data frame size is negotiated during the beacon phase and can be dynamically sized down from this by way of a SetMaxRcvFrameSize stream zero command. A host which does not have DMA will typically limit the data frame size it receives and sends so as to limit the amount of time that it keeps interrupts turned off during reception and transmission of data frames. For example, at a rate of 918 KBits/Sec the transmission time for 255 bytes is 2.2 ms.

Figure 11:
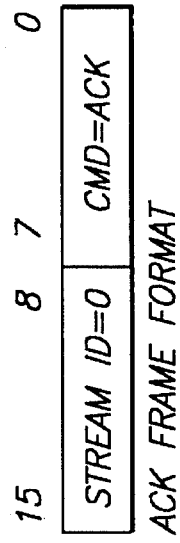
FIG. 11 is a diagram of a Poll Frame with Length format used by the telecommunications interface in a Polled Receive Mode of the Packetized Interface Mode.
Figure 12:
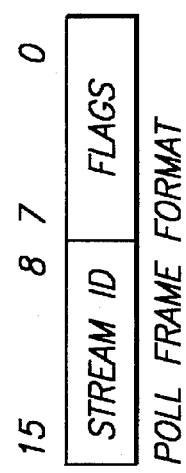
FIG. 12 is a diagram of a Stream Zero Poll Frame format used by the telecommunications interface in a Polled Receive Mode of the Packetized Interface Mode.
Figure 13:
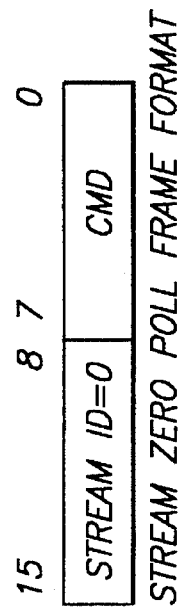
FIG. 13 is a diagram of an Ack Frame format used by the telecommunications interface in a Polled Receive Mode of the Packetized Interface Mode.

There are three types of poll frames, shown in FIG. 11, FIG. 12, and FIG. 13, respectively. The first two types are used to send data on all streams except stream zero. The third type of poll frame is used on stream zero.

The first type of Poll Frame shown in FIG. 11 includes just the stream ID and flags field. This allows support for 255 data streams, not counting stream zero. The second Poll Frame, shown in FIG. 11, includes a length field. The length field allows for more efficient reception of data in a polled software loop since the software doesn't need to check for the HDLC End Of Frame to determine the end of the frame. This allows for reception of data at higher data rates.

The first byte of the Stream Zero Poll Frame, as shown in FIG. 12, has the value zero to identify stream zero. The second byte identifies a specific stream zero command. Some stream zero commands have associated parameters. In this case once the receiving side sends the ack frame the sender will send a data frame consisting of the associated parameters. If there are no associated parameters then no frame will be sent in response to the ack frame.

The flags field is described in detail below.

The Ack Frame is simply a stream zero command as shown in FIG. 13. It does not include the associated stream ID, which was indicated in the poll frame, since only one poll can be outstanding at any one time in each direction.

On data transfers from the pod to the host the host's interrupts are turned off from the start of the host sending the ack packet until the data packet has been completely received from the pod. Thus the maximum interrupt off time is also dependent on the maximum response time of the pod from receipt of the ack packet to the beginning of the data packet. This response time of the pod is referred to as the ack response time and is specified in an exemplary embodiment as a maximum of 1 ms, although other value may be used. However, the pod should keep this time to a minimum since it will have a dramatic effect on both the performance of the telecommunications interface and the computer system. In an exemplary embodiment, a minimum ack response time of 50 µs is also defined, which allows the receiving side some time to set up to receive the data.

Figure 15:
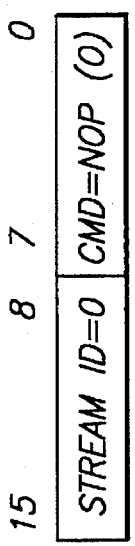
FIG. 15 is a diagram of a NOP Frame format used by the telecommunications interface in a Polled Receive Mode of the Packetized Interface Mode.
Figure 14:
FIG. 14 is a diagram of a Data Frame format used by the telecommunications interface in a Polled Receive Mode of the Packetized Interface Mode.

The data frame, as shown in FIG. 14, contains, in order, the data, and an appended poll sequence possibly indicating another frame to follow. The appended poll sequence eliminates the need for the sender to send a separate poll frame in order to send more data. This allows for more efficient transfer of large amounts of data. If the two trailer bytes are both 0 this constitutes a stream zero NOP frame, shown in FIG. 15, which indicates that there are no more frames to be sent. If the trailer does indicate that there is more data then the receiver simply responds with an ack frame and another data frame will be sent.

If the host is in the process of sending data to the pod and it receives a poll packet from the pod it will, after the completion of the current HDLC frame to the pod, send an ack and receive data from the pod. The host will not return to the transmit process until after completing the receive process. Thus the host gives higher priority to the receive process than the transmit process.

When both the host and the pod are using the polled receive mode a situation can arise where they both send a poll frame at the same time which results in what is called a poll frame collision as shown in FIG. 17. A deadlock situation could arise in this case since both the host and the pod are waiting for an ack frame to send their data. In order to avoid deadlock the pod is given higher priority and a method is devised by which the host and pod can recover from a poll frame collision. When the pod knows that both the host and the pod are operating in the polled receive mode it will wait for 100 µs after sending a poll frame to see if it gets a poll frame from the host. If it gets a poll frame in this time period it should read it into memory and remember the contents so it can be serviced later. When the host receives a poll frame from the pod while it is waiting for an ack frame to its own poll frame, it will wait for at least 200 µs before sending the ack frame to the pod. Thus the host and pod will continue with the pod's transfer of data to the host. When this is complete the pod should send an ack frame in response to the outstanding poll frame from the host and the host can complete its transfer to the pod.

FIG. 17 shows some packet exchanges on the serial telecommunications interface where both the host and the pod are in the polled receive mode.

Isochronous Data Exchange

Isochronous data exchange can work in one of two modes, Isochronous Transmit Hand-shake Mode and Isochronous Data Driven Mode. Isochronous Transmit Handshake Mode can only be used on a host which supports the specified DMA interface. It is used to support isochronous streams which have critical timing requirements, such as a V.32 sample stream. In this case the timing of the isochronous data exchange is driven by the pod by utilizing the transmit handshake line. This is illustrated in FIG. 18.

The Isochronous Data Driven Mode is used where such critical timing requirements are not necessary. In this mode the pod simply monitors its receive sample buffers (buffers containing data from the communications line which the pod will send to the host across the telecommunications interface). When a programmable threshold (determined by latency requirements and the amount of buffer space in the pod) is met, then the pod will initiate the isochronous data exchange by sending isochronous data to the host. When the host begins to receive isochronous data from the pod it should respond with an equal or lesser amount of outbound isochronous dam. The host will respond with less data, including none, if it does not have an equal amount of data to send. This would be perfectly natural, for example, on a message machine when a greeting that is being played is completed. The host discovers the total amount of isochronous data to be exchanged from the Total Iso Length field in the first packet from the pod.

Stream Flags

All stream data between the Mac and pod is accompanied by a flags byte. Some flag bits have meaning on all streams while others are specific to the type of stream of the packet.

The following flags are defined on command streams:

Bit 0 BOB: A 1 in the Beginning of Block bit indicates that this packet is the first packet of a command or response which are always transferred as a block.

Bit 1 EOB: A 1 in the End of Block bit indicates that this packet is the last packet of a command or response.

Bit 2 Command/Response: a 0 indicates that this is a command and a 1 indicates that this is a response.

Flags defined on asynchronous streams are as follows:

Bit 0 BOB: A 1 in the Beginning of Block bit is used on block mode asynchronous streams to indicate that this packet is the first packet of a block of data which is to be delivered to the client as one unit. This bit has no meaning on stream mode asynchronous streams.

Bit 1 EOB: A 1 in the End of Block bit is used on block mode asynchronous streams to indicate that this packet is the end of a block of data. This bit has no meaning on stream mode asynchronous streams.

Bit 2 Includes Credit: this bit is set to indicate that a two byte argument is appended to the end of the packet which is the receive credit for this asynchronous stream.

For isochronous streams the following flags are defined:

Bit 0 BOB: A 1 in the Beginning of Block bit is used to indicate that this packet is the first packet of a block of isochronous dam. The first packet indicates the total number of isochronous bytes which will be sent by appending a two byte length field at the end of the packet.

Bit 1 EOB: A 1 in the End of Block bit is used to indicate the end of a block of isochronous data.

Stream Zero Commands

Stream zero is reserved by the telecommunications interface Serial Driver to send control and status packets which are used to control the telecommunications interface Serial Protocol. The information field of a stream zero command packet is made up of a list of commands with associated parameters. In the case of the polled receive mode the command value is sent in the poll frame and any associated parameters are sent in the following data frame. If there are no parameters then no data frame is sent.

The following commands are defined in an exemplary embodiment:

NOP(void)

NOP indicates no operation. It is primarily used at the end of a polled receive mode data frame to indicate that no more immediate frames are to be sent.

Ack (void)

Ack is used in the polled receive mode protocol to indicate to the sender of a poll frame that the receiver of the poll frame is prepared to receive the associated data frame.

Nak (void)

Nak is used in the polled receive mode protocol to indicate to the sender of a poll frame that the receiver of the poll frame is prepared to receive the associated data frame.

SetMaxRcvFrameSize (ushort MaxRcvFrameSize)

SetMaxRcvFrameSize indicates to the receiver of this command that it should limit all future frames it sends to this maximum size. The sender of the SetMaxRcvFrameSize command should still be capable of receiving frames up the maximum size negotiated at beacon time since some packets may be sent before the size can be adjusted. The SetMaxRcvFrameSize command will often be used by the host to adjust the interrupt off time in response to varying processing requirements in the host.

GetDataResponseTime (void)

GetDataResponseTime is sent by the host to request the pod to send an estimation of its Data Response time in a SetDataResponseTime command described next.

SetDataResponseTime (ulong DataResponseTime)

SetDataResponseTime is sent by the pod in response to receiving the GetDataResponseTime command from the host. The timing indicated by this command is only used by the host while receiving back to back data frames from the pod. When the pod sends a poll sequence in the trailer of a data packet which indicates that it has more data to send it may take some time for the pod to prepare the next set of data. The DataResponseTime indicates the maximum time in microseconds the pod will require to prepare the next set of data to send to the host. The host will typically not respond with the ack then until this time has elapsed to limit the time that interrupts are turned off.

PrimaryCredit (ulong SendCredit)

Provides the primary credit to the other side. Primary credit is described below.

Note that this is just an exemplary list to which commands may be added and from which command may, in other embodiments, be deleted.

Rate Control

Rate Control provides a basic level of pacing of transmit data from the host to the pod. It is only used on asynchronous data streams. This helps assure that all asynchronous streams get lair access to the telecommunications interface bandwidth.

The rate control algorithm is taken directly from that defined for the XTP protocol. Rate control is characterized by three parameters:

1. Rate: the rate of the communications line in bytes/sec, e.g. for an ISDN 'B' channel this would be 8 KBytes/Sec.
2. Burst: the maximum number of bytes to be sent in a burst of packets.
3. RTimer: equal to burst divided by rate which is the period over which the channel's data rate is held to burst number of bytes.

The basic algorithm works as follows. A rate credit is allocated to each stream which is initially set to the burst value. As each packet is transmitted the rate credit is decremented by the number of bytes in the packet. When the rate credit reaches zero or less no more data can be sent on this stream until the RTimer expires at which time each stream's credit is adjusted as follows:

1. If the rate credit is zero or less then the burst value is added to the current value of rate credit.
2. If the rate credit is greater than zero then rate credit is simply set to the burst value.

Rate control does not require any interaction between the host and the pod since the algorithm is executed totally within the host. Rate control is not required from the pod to the host since that rate is inherently limited by the rate of data being received on the communication channels. However, this does not preclude pods from implementing rate control.

Primary Flow Control

In addition to flow control being necessary on a per stream basis, flow control may also be required at the multiplexed level; i.e., there is a limited amount of DMA buffer space in the host and the pod which could be overflowed if there is no way to control the stream of bytes on the cable. Primary flow control utilizes sliding window flow control, to be presently described, on a HDLC frame basis; i.e., each unit of flow control corresponds to one full HDLC frame. Primary credit is communicated using the stream zero command Primary Credit described previously.

Primary flow control is only provided in the case of the DMA receive mode. Some frames however are not controlled by this flow control, namely Poll and Ack packets, and frames which include isochronous data. The host and pod must reserve a fixed number of DMA buffers for these packets and they will always be processed in real time.

Primary flow control is not used in the case of the non-DMA interface. In non-DMA receive mode data is transferred directly to the stream buffers and thus stream specific flow control is enough to guarantee proper flow control.

Sliding Window Flow Control

Sliding window flow control is used on asynchronous streams. Normally, the sliding window algorithm is not only used for flow control but also to provide for error correction. However, the present telecommunications interface is assumed to be an error free interface, so in this case the sliding window algorithm is simply used for flow control. This simplifies the use of this algorithm since the sending side does not need to keep around data until it is acknowledged. Instead, the window is simply a credit of how much data the receiving side is willing to accept.

When stream mode service is being provided the flow control credit is given in units of bytes. When the block mode service is being provided the flow control credit is given in units of client blocks or packets.

The flow control credit is a 16 bit quantity which starts at zero upon initialization. The sending side keeps track of two variables, sent and send credit. Send credit is the value sent by the receiver indicating how much data it is willing to accept. Sent is the amount of data that has been sent. At any one time the transmitter is allowed to send no more than send credit minus sent data units.

The receiver initially sends a send credit equal to the amount of free buffer space that has been allocated. When data is received, processed and the buffer space is freed up again the send credit is increased by the amount of buffer space freed up. This send credit is then communicated to the sender as a stream zero command.

Following is an example for an asynchronous stream providing stream mode service:

1. The receiver allocates a receive buffer of 1000 bytes and sends a send credit value of 100 to the sending side;
2. The sender sends 100 bytes to the receiver and bumps its sent variable to 100. At this point the transmitter could send 1000−100=900 more bytes;
3. The receiver processes the data and frees up the buffer space;
4. The receiver bumps the send credit value to 1000+100=1100 and sends this to the sending side;
5. The sender is now allowed to send "send credit" minus sent bytes to the receiver, namely 1100−100= 1000.

Stop and Wait Flow Control

Stop and wait flow control is used on command streams. As mentioned previously stop and wait flow control only allows one block to be outstanding on a stream in each direction at one time. However, the stream handlers at each side will usually queue up multiple transmit requests for the client. If a block of data requires more than one frame to send then it will be sent in multiple frames with the EOB bit in the flags byte set in the last packet. Another block will not be sent on that stream until a Response has been received from the other side. The response is also sent as a block with the Response bit in the flags bit set.

The order of events in sending data on a Stop and Wait stream is as follows:

1. The sending client requests to send some data;
2. The telecommunications interface Serial Driver queues up the data on the client's stream queue;
3. The data reaches the head of the stream's queue when the response to the previous data has been received. It is then scheduled on the serial line and finally sent in one or more frames;
4. On the receiving side the data is posted to the receiving client;
5. When the receiving client indicates to the telecommunications Serial Driver that it is finished with the data, along with possibly including response data, a response frame is sent back to the originating side;
6. When the originating telecommunications interface Serial Driver receives the response it completes the originating send to the sending client along with any response data.
7. The originating telecommunications interface Serial Driver is now allowed to send the next data request on the stream.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. In a computer having a data processor, a data communications port and an instruction memory, a general-purpose data communications method for communicating between said computer and a portable data communications device connected to said computer by a point-to-point computer cable, said method comprising the steps of:

determining from a data communications device a desired data communications mode from among a first data communications mode, well-suited to at least analog-derived data, in which data to be communicated is inserted into recurring time slots, and a second data communications mode, well-suited to at least asynchronous digital data, in which data to be communicated is assembled into data packets;

sending a signal from the data communications port to the data communications device to cause the data communications device to send data identifying itself;

receiving in accordance with a predetermined data transmission convention data from the data communications device identifying the data communications device as being of one of a number of first predetermined types of data communications devices;

when the desired data communications mode is the second data communications mode, sending data to the data communications device identifying one or more of: a maximum data speed supported by the computer, a maximum data frame size that the computer will receive from the data communications device, and a maximum data frame size that the computer will send to the data communications device; and when the desired data communications mode is the second data communications mode, receiving in response to the data sent to the data communications device data from the data communications device identifying one or more of: a maximum data speed supported by the data communications device, a maximum data frame size that the data communications device will receive from the computer, and a maximum data frame size that the data communications device will send to the computer;

wherein the second data communications mode includes a polled receive mode in which a data exchange is preceded by exchange of a poll frame in one direction between the computer and the data communications device and an acknowledgment frame in an opposite direction between the computer and the data communications device, and a direct memory access receive mode in which data packets are allowed to be sent without notification, and wherein the data sent to the data communications device identifies a receive mode of the computer and an expected receive mode of the data communications device.

2. The method of claim 1, wherein data packets are framed using HDLC framing.

3. The method of claim 2, wherein poll frames and acknowledgment frames are allowed to be sent at any time.

4. The method of claim 1, wherein time slots are framed using asynchronous framing.

5. The method of claim 1, wherein the data sent from the data communications device to the computer identifies a receive mode of the computer and a receive mode of the data communications device, which are allowed to vary in predetermined instances from the receive mode of the computer and the expected receive mode of the data communication device as identified by the computer.

6. In a computer having a data processor, a data communications port and an instruction memory, a general-purpose data communications method for communicating between said computer and a portable data communications device connected to said computer by a point-to-point computer cable, said method comprising the steps of:

determining from a data communications device a desired data communications mode from among a first data communications mode, well-suited to at least analog-derived data, in which data to be communicated is inserted into recurring time slots, and a second data communications mode, well-suited to at least asynchronous digital data, in which data to be communicated is assembled into data packets;

concurrently exchanging multiple data streams with the data communications device by, in the first data communications mode, time-division-multiplexing data for the multiple data streams in an information field or a time-division-multiplex data frame in accordance with parameters associated with each of the multiple data streams, and by, in the second data communications mode, associating with each data packet a stream number identifying a respective one of the multiple data streams wherein, in the second data communications mode, a predetermined stream number is reserved for use in association with a command stream, wherein the means for concurrently exchanging multiple data streams uses the command stream identified by the predetermined stream number to exchange commands with the data communications device, and wherein the second data communications mode includes a direct memory access receive mode in which data packets are allowed to be sent without notification.

7. The method of claim 6, wherein a data packet in direct memory access receive mode comprises a stream identifier field, a flags field, a length field, and an information field having a length indicated in the length field.

8. The method of claim 7, wherein the data packet in direct memory access receive mode further comprises a pad field of a length such that the total length of the data frame is an integral number of long words.

9. The method of claim 8, wherein a multi-packet data frame in direct memory access receive mode comprises multiple contiguous data packets.

10. The method of claim 6, wherein the second data communications mode in which data is assembled in data packets further includes a polled receive mode in which exchange of a data frame is preceded by exchange of a poll frame in one direction between the computer and the data communications device and an acknowledgment frame in an opposite direction between the computer and the data communications device.

11. The method of claim 6, wherein a first type of poll frame comprises a stream identifier field and a flags field.

12. The method of claim 11, wherein a second type of poll frame comprises and stream identifier field, a flags field, and a length field indicating the length of a corresponding forthcoming data frame.

13. The method of claim 6, wherein a data frame in polled receive mode comprises a data field and a poll sequence field.

14. The method of claim 13, wherein a first setting of the poll sequence field operates as a poll frame and a second setting of the poll sequence field does not.

15. In a computer having a data processor, a data communications port and an instruction memory, a general purpose data communications method for communicating between said computer and a portable data communications device connected to said computer by a point-to-point computer cable, said method comprising the steps of:

determining from a data communications device a desired data communications mode from among a first data communications mode, well-suited to at least analog-derived data, in which data to be communicated is inserted into recurring time slots, and a second data communications mode, well-suited to at least asynchronous digital data, in which data to be communicated is assembled into data packets; and responsive to determining a desired data communications mode, performing data communications according to the desired data communications mode;

wherein the data communications port comprises a serial port, wherein the serial port comprises a female serial port connector having eight pin connectors or nine pin connectors, and wherein the second data communications mode includes a direct memory access receive mode in which data packets are allowed to be sent without notification and during which one pin connector is assigned as a transmit handshake input.

16. The method of claim 15, wherein the pin connector assigned as a transmit handshake input is a dual-function pin connector further assigned as a wakeup input.

17. The method of claim 15, wherein the serial connector has eight pin connectors and is a Mini-DIN 8 female serial port connector that accepts a Mini-DIN 8 male serial port connector.

18. The method of claim 17, wherein respective pin connectors of the female serial port connector are assigned functions as follows:

| Pin Connector Number | Function |
|---|---|
| 1 | Reset/Attention Output |
| 2 | Serial Clock Input |
| 3 | Transmit Data (−) |
| 4 | Ground Return |
| 5 | Receive Data (−) |
| 6 | Transmit Data (+) |
| 8 | Receive Data (+). |

19. The method of claim 15, wherein the serial port connector has nine pin connectors, one of the pin connectors being assigned to supply power to the communications device.

20. The method of claim 19, wherein the serial port connector is a Mini-DIN 9 female serial port connector that accepts both a Mini-DIN 9 male serial port connector and a Mini-DIN 8 male serial port connector and is differentiated from a Mini-DIN 8 female serial port connector in such a way that the Mini-DIN 8 female serial port connector will not accept a Mini-DIN 9 male serial port connector.

21. The method of claim 20, wherein respective pin connectors of the female serial port connector are assigned functions as follows:

| Pin Connector Number | Function |
|---|---|
| 1 | Reset/Attention Output |
| 2 | Serial Clock Input |
| 3 | Transmit Data (−) |
| 4 | Ground Return |
| 5 | Receive Data (−) |
| 6 | Transmit Data (+) |
| 8 | Receive Data (+) |
| 9 | DC Power Output. |

* * * * *

UNITED STATES PATENT AND TRADEMARK OFFICE
CERTIFICATE OF CORRECTION

PATENT NO. : 5,515,373
DATED : May 7, 1996
INVENTOR(S) : John LYNCH et al.

It is certified that error appears in the above-indentified patent and that said Letters Patent is hereby corrected as shown below:

Item [57], line 18,
In the abstract, after "non-DMA interface mode", delete "am" and insert --are--.

Signed and Sealed this

Seventeenth Day of September, 1996

Attest:

BRUCE LEHMAN

Attesting Officer    Commissioner of Patents and Trademarks